US012771945B2

(12) United States Patent
Kang

(10) Patent No.: US 12,771,945 B2
(45) Date of Patent: Oct. 20, 2026

(54) SURROUND VIEW MONITORING APPARATUS AND METHOD WITH FAULT TOLERANCE

(71) Applicants: HYUNDAI MOTOR COMPANY, Seoul (KR); KIA CORPORATION, Seoul (KR)

(72) Inventor: Min Chul Kang, Uiwang-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 69 days.

(21) Appl. No.: 18/397,150

(22) Filed: Dec. 27, 2023

(65) Prior Publication Data

US 2025/0008223 A1 Jan. 2, 2025

(30) Foreign Application Priority Data

Jun. 29, 2023 (KR) ........................ 10-2023-0083931

(51) Int. Cl.

*H04N 23/698* (2023.01)
*B60R 1/27* (2022.01)
*G07C 5/08* (2006.01)
*H04N 5/262* (2006.01)
*H04N 17/00* (2006.01)

(52) U.S. Cl.

CPC ............. *H04N 23/698* (2023.01); *B60R 1/27* (2022.01); *H04N 5/2628* (2013.01); *H04N 17/002* (2013.01); *B60R 2300/105* (2013.01); *B60R 2300/303* (2013.01); *G07C 5/0816* (2013.01)

(58) Field of Classification Search

CPC .. H04N 23/698; H04N 5/2628; H04N 17/002; H04N 13/282; H04N 23/90; B60R 1/27; B60R 2300/105; B60R 2300/303; G07C 5/0816; B60K 35/00; B60K 35/26; B60K 35/28; B60K 35/29; B60Y 2400/92

See application file for complete search history.

(56) References Cited

U.S. PATENT DOCUMENTS

2015/0254825 A1* 9/2015 Zhang ................... G06T 3/4038 382/284
2018/0211118 A1* 7/2018 Diessner ................ G08G 1/167
2019/0106105 A1* 4/2019 Koravadi .............. B60W 30/09
2020/0007790 A1* 1/2020 Hoffmann ................. B60R 1/02
2022/0118908 A1* 4/2022 Lee ...................... H04N 5/2628
2022/0207278 A1* 6/2022 Nagata ..................... H04N 5/76
2023/0171397 A1* 6/2023 Dabral ................... H04N 23/80
2023/0179745 A1* 6/2023 Baek ...................... B62D 41/00 348/148

* cited by examiner

*Primary Examiner* — Farzana Hossain
(74) *Attorney, Agent, or Firm* — Lempia Summerfield Katz LLC

(57) ABSTRACT

A surround view monitoring apparatus with fault tolerance and an operating method thereof. The surround view monitoring apparatus includes a plurality of SVM cameras, a SVM controller and an SVM display. The plurality of SVM cameras are configured to capture surrounding areas of a vehicle. The SVM controller is configured to determine whether at least one of the plurality of SVM cameras has failed and to generate a surround view image based on images captured by the plurality of SVM cameras. The SVM display is configured to display the generated surround view image.

13 Claims, 7 Drawing Sheets

SURROUND VIEW MONITORING APPARATUS AND METHOD WITH FAULT TOLERANCE

CROSS-REFERENCE TO RELATED APPLICATIONS

This application claims the benefit of and priority to Korean Patent Application Number 10-2023-0083931, filed on Jun. 29, 2023, the disclosure of which is incorporated by reference herein in its entirety.

FIELD

The present disclosure relates to a surround view monitoring apparatus that is configured to provide a surround view image of a vehicle through functional cooperation with a built-in cam even when an abnormality occurs in a surround view monitor camera of the vehicle.

BACKGROUND

The description in this section provides background information related to the present disclosure and does not necessarily constitute the related art.

A Surround View Monitor (SVM) improves the safety and convenience of driving a vehicle by providing a driver with an image of the surrounding situation while driving or parking. The SVM synthesizes images input from four wide-angle cameras mounted on the front, rear, left, and right sides of a vehicle to show the surrounding situation of the vehicle in various views. In addition, the SVM may include a function of showing a 360° variable 3D view around the vehicle and transmitting the image around the vehicle to a smartphone.

The SVM shows the surrounding situation of a vehicle as images from various viewpoints for safe parking. However, if one of the four wide-angle cameras is disabled, it is difficult to secure an omnidirectional view around the vehicle. Accidents may occur if it is impossible to secure an omnidirectional view around the vehicle while driving or parking. Accordingly, it is necessary to secure an omnidirectional view of the vehicle even when one or more cameras of the SVM are disabled.

SUMMARY

Embodiments of the present disclosure provide continuously surround views of a vehicle by using a built-in cam image and an SVM camera image adjacent to the failed camera even when one or more SVM cameras fail.

Embodiments of the present disclosure further provide a fault tolerant surround view monitoring apparatus without additional configuration of hardware.

The purposes of the present disclosure are not limited to those mentioned above, and other purposes not mentioned herein should be clearly understood by those having ordinary skill in the art from the following description.

According to at least one embodiment of the present disclosure, a surround view monitoring (SVM) apparatus with fault tolerance includes a plurality of SVM cameras, a SVM controller and a SVM display. The plurality of SVM cameras are configured to capture surrounding areas of a vehicle. The SVM controller is configured to determine whether at least one of the plurality of SVM cameras has failed and generate a surround view image based on images captured by the plurality of SVM cameras. The SVM display is configured to display the generated surround view image.

In another embodiment, the SVM controller generates a surround view image by utilizing images captured by the plurality of SVM cameras and images captured by at least one of a front camera and a rear camera included in a built-in cam, when at least one of a front SVM camera for capturing a front of the vehicle and a rear SVM camera for capturing a rear of the vehicle are determined to have failed among the plurality of SVM cameras.

According to another embodiment, the present disclosure provides a method performed by a surround view monitoring apparatus with fault tolerance. The method includes: determining whether at least one of a plurality of SVM cameras has failed, generating a surround view image based on images captured by the plurality of SVM cameras, and displaying the generated surround view image on an SVM display.

In an embodiment, generating a surround view image comprises generating a surround view image by further utilizing images captured by the plurality of SVM cameras and images captured by at least one of a front camera and a rear camera included in a built-in cam, when at least one of the front SVM camera and the rear SVM camera are determined to have failed.

According to an embodiment of the present disclosure, even if one or more SVM cameras fail, it is possible to improve the convenience and safety of driving a vehicle by providing a surround view of the vehicle continuously.

The effects of the present disclosure are not limited to the effects mentioned above, and other effects not mentioned should be clearly understood by those having ordinary skill in the art from the descriptions below.

DETAILED DESCRIPTION

Figure 1:
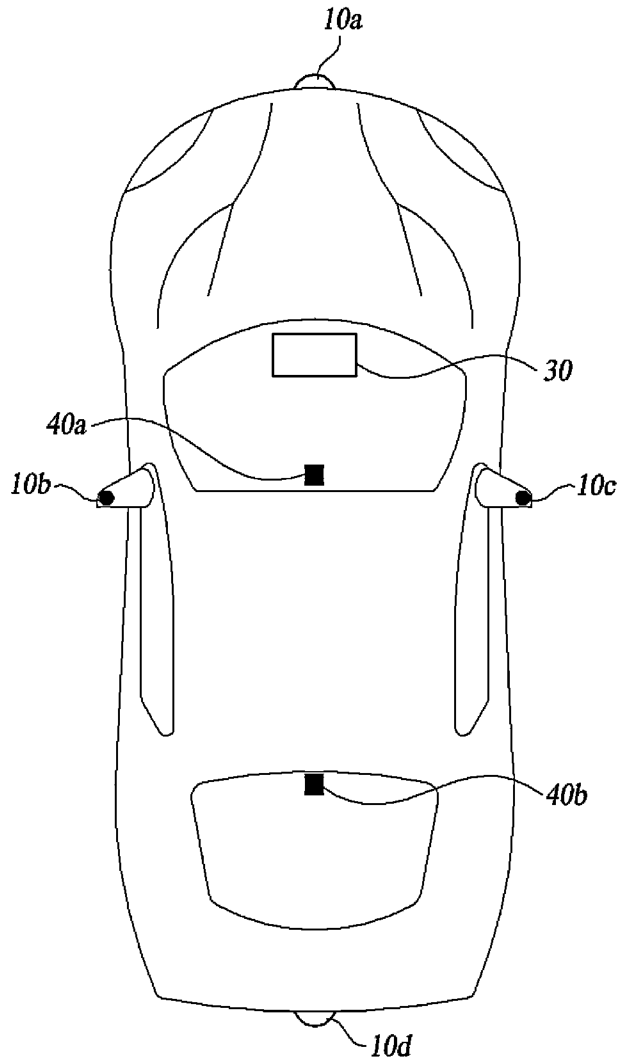
FIG. 1 is a diagram illustrating a vehicle equipped with a portion of the configurations for providing a fault tolerant function of a surround view monitoring apparatus according to an embodiment of the present disclosure.

Hereinafter, some embodiments of the present disclosure are described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of the present disclosure have been omitted for the purpose of clarity and for brevity.

Various ordinal numbers or alpha codes such as first, second, i), ii), a), b), etc., are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

In the following description, when a component, device, element, or the like of the present disclosure is described as having a purpose or performing an operation, function, or the like, the component, device, or element should be considered herein as being "configured to" meet that purpose or perform that operation or function.

The description of the present disclosure to be presented below in conjunction with the accompanying drawings is intended to describe exemplary embodiments of the present disclosure and is not intended to represent the only embodiments in which the technical idea of the present disclosure may be practiced.

The present disclosure relates to a surround view monitoring apparatus and method capable of continuously providing a surround view image of a vehicle to a driver even when an abnormity occurs in a surround view monitor camera of the vehicle.

FIG. 1 is a diagram of a vehicle equipped with a portion of the configurations for providing a fault tolerant function of a surround view monitoring apparatus according to an embodiment of the present disclosure.

Referring to FIG. 1, a vehicle according to an embodiment of the present disclosure includes a plurality of wide-angle cameras 10*a*, 10*b*, 10*c*, and 10*d*, an SVM display 30, and a plurality of built-in cam cameras 40*a* and 40*b*.

The plurality of wide-angle cameras 10*a*, 10*b*, 10*c*, and 10*d* are configured to capture the surrounding area of a vehicle. The captured images are provided to an SVM controller 20 as input sources for generating a surround view image. The plurality of wide-angle cameras are illustrated as being mounted on the front, rear, and left/right outside mirrors of the vehicle, but are not limited thereto. The plurality of wide-angle cameras may be ultra-wide-angle cameras having an angle of view of 180 degrees or more.

The SVM display 30 is configured to display an image transmitted from the SVM controller 20 or a built-in cam controller 50. The SVM display 30 may display a surround view image and/or a surrounding image of a viewpoint selected by a driver. The SVM display 30 may be a digital cluster of a vehicle, an AVN display, an infotainment display, a HUD (Head-Up Display), and the like, but is not limited thereto.

A built-in cam is a driving video recording device that is configured for capturing and storing front and/or rear images while driving or parking a vehicle, and may include the plurality of built-in cam cameras and the built-in cam controller 50. The plurality of built-in cam cameras include a front camera 40*a* and a rear camera 40*b*, and images captured by the plurality of built-in cam cameras may be provided for the fault tolerant function of the surround view monitoring apparatus according to an embodiment of the present disclosure.

Figure 2:
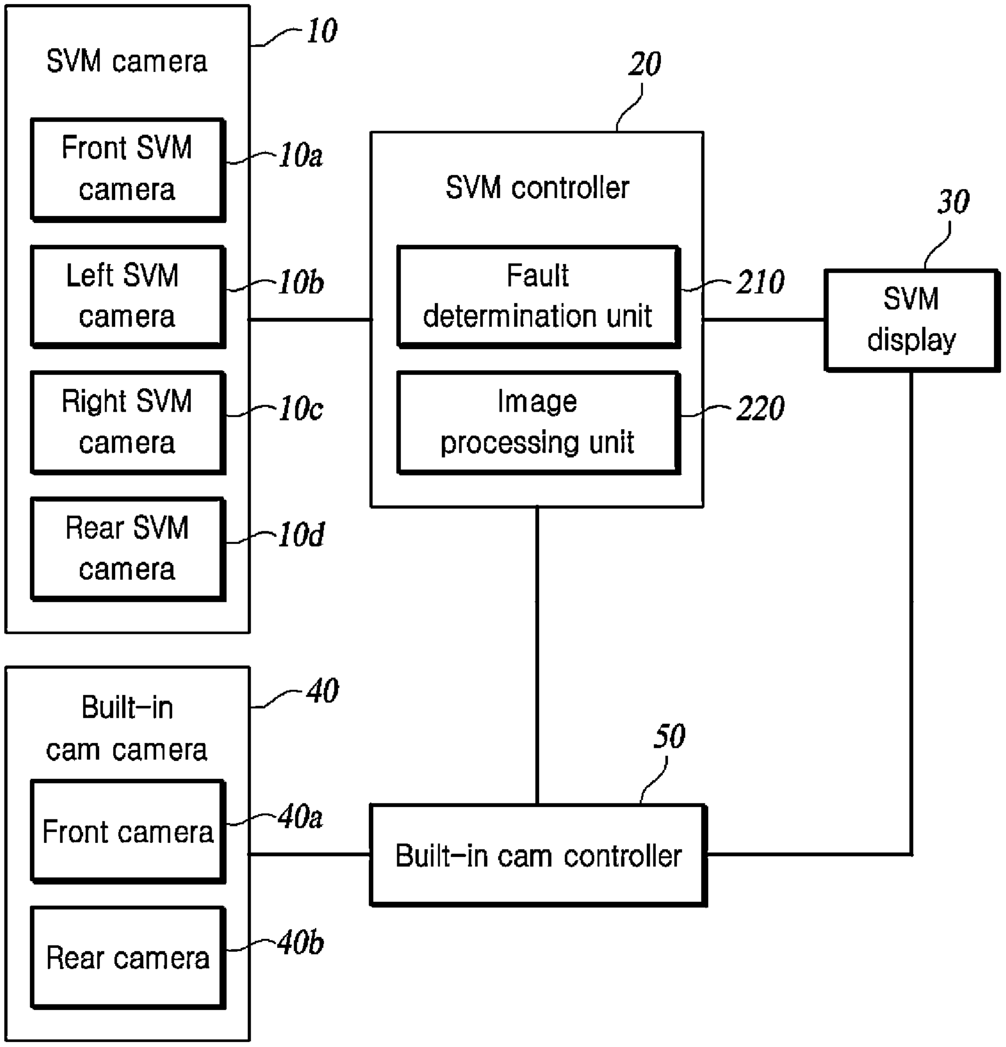
FIG. 2 is a block diagram depicting a surround view monitoring apparatus according to an embodiment of the present disclosure.

FIG. 2 is a block diagram depicting a surround view monitoring apparatus according to an embodiment of the present disclosure.

Referring to FIG. 2, the surround view monitoring apparatus according to an embodiment of the present disclosure includes a plurality of SVM cameras 10*a*, 10*b*, 10*c*, and 10*d*, the SVM controller 20, and the SVM display 30. The surround view monitoring apparatus performs functional co-operation with the built-in cam for each situation to continuously provide a surround view even when one or more SVM cameras fail. Herein, the built-in cam may include the plurality of built-in cam cameras 40*a* and 40*b* and the built-in cam controller 50.

The constituents of the surround view monitoring apparatus may transmit or receive signals or data using various communication protocols existing in a vehicle. The surround view monitoring apparatus and the built-in cam may transmit or receive signals or data using various communication protocols. The communication protocol may include at least one of CAN (Controller Area Network), CAN FD (CAN with Flexible Data rate), LIN (Local Interconnect Network), FlexRay, and Ethernet.

The plurality of SVM cameras, the SVM display, and the plurality of built-in cam cameras are respectively the same as the plurality of wide-angle cameras 10*a*, 10*b*, 10*c*, and 10*d*, the SVM display 30, and the plurality of built-in cam cameras 40*a* and 40*b* in FIG. 1.

The SVM controller 20 is disposed inside a vehicle and may be an ECU (Electronic Control Unit). The SVM controller 20 may include a hardware processor and memory. The memory stores commands for executing the SVM controller 20 and a Look-Up Table (LUT), but is not limited thereto, and may include all configurations for overall control of the surround view monitoring apparatus.

The SVM controller 20 determines whether one or more of the plurality of SVM cameras 10 has a failure, and controls the processing of images captured by the plurality of SVM cameras to transmit an output image to the SVM display 30. The SVM controller 20 may include a fault determination unit 210 and an image processing unit 220.

The fault determination unit 210 determines whether a failure has occurred in one or more of the plurality of SVM cameras 10*a*, 10*b*, 10*c*, and 10*d*. The fault determination unit 210 may monitor whether the plurality of SVM cameras 10*a*, 10*b*, 10*c*, and 10*d* have failed at predetermined time intervals while the SVM system is on. The fault determination unit 210 may determine whether the built-in cam camera 40 or the built-in cam controller 50 has failed based on the output signal of the built-in cam controller 50.

When one or more of the plurality of SVM cameras 10 are determined to have failed, the fault determination unit 210 transmits information about the failed SVM camera to the image processing unit 220. In addition, when the failed SVM camera is the front SVM camera 10*a* and/or the rear SVM camera 10*d*, the fault determination unit 210 may instruct the image processing unit 220 to further utilize the front and/or rear images captured from the built-in cam camera 40 to perform image processing. In addition, the fault determination unit 210 may selectively provide a notification to a driver that a failure occurs in some of the plurality of SVM cameras 10 and the SVM function is performing in a fault tolerant mode, using an in-vehicle display device or a speaker device.

When all of the plurality of SVM cameras 10 are determined to have failed, the fault determination unit 210 may reset the plurality of SVM cameras 10. The fault determination unit 210 may request the built-in cam controller 50 to transmit front and/or rear images of a vehicle captured by the built-in cam camera to the SVM display 30. In addition, the fault determination unit 210 may selectively provide a notification to a driver that a failure has occurred in all of the plurality of SVM cameras 10 and the SVM function is performing based on the built-in cam image, using an in-vehicle display device or a speaker device.

Upon receiving the request, the built-in cam controller 50 may transmit front and/or rear images of a vehicle captured by the built-in cam camera to the SVM display 30. For example, when the SVM function is performed based on the built-in cam image in a rear-view mode, only the rear image captured from the built-in cam camera may be displayed on the SVM display 30 as illustrated in FIG. 4C.

When the SVM operates normally, the image processing unit 220 performs image processing based on images captured by the plurality of SVM cameras, and transmits a surround view image and/or a surrounding image at a viewpoint selected by a driver to the SVM display 30. The image processing process may include a process of matching the images after performing target area setting, distortion correction, and perspective transform on each of the images captured by the plurality of SVM cameras. The target area refers to a specific range of an image to be provided as an input for generating a surround view image.

When the SVM function is performed in a fault tolerant mode, the image processing unit 220 performs corresponding image processing based on the information about the failed SVM camera received from the fault determination unit 210.

The image processing unit 220 sets the target area of an image captured by the working SVM camera adjacent to the failed SVM camera to include an overlapping area. The overlapping area refers to an area overlapping between the capturable range of the failed SVM camera and the capturable range of an adjacent SVM camera in normal operation. This is to reduce an empty area of a surround view image due to a failure of some SVM cameras by using an image of a maximum angle of view captured by the working SVM camera adjacent to the failed SVM camera.

The image processing unit 220 may perform image processing using an image captured by the built-in cam camera 40 when the failed SVM camera is the front SVM camera 10*a* and/or the rear SVM camera 10*d*. This is to replace the empty area of the surround view image, which is not resolved with the image of the maximum angle of view captured by the working SVM camera adjacent to the failed SVM camera, with the built-in cam image.

Hereinafter, an image processing process is described in detail with reference to FIGS. 3 to 4G.

Figure 3:
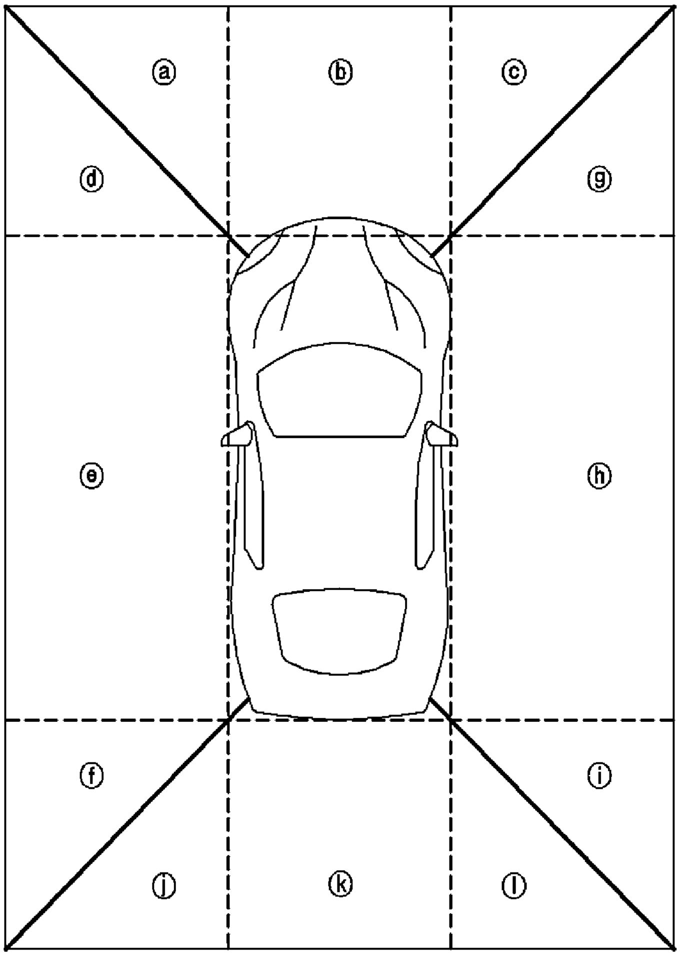
FIG. 3 is a diagram for explaining a maximum angle of view and a corresponding area within a surround view image of each of a plurality of SVM cameras.

FIG. 3 is a diagram for explaining a maximum angle of view and a corresponding area within a surround view image of each of a plurality of SVM cameras. Each of the plurality of SVM cameras is assumed to be an ultra-wide-angle camera having a maximum angle of view of 180 degrees.

Referring to FIG. 3, an original image captured by the front SVM camera 10*a* may include areas ⓐ, ⓑ, ⓒ, ⓓ, and ⓖ above the upper dotted line. The original image captured by the left SVM camera 10*b* may include areas ⓐ, ⓓ, ⓔ, ⓕ, and ⓙ to the left of the left dotted line. The original image captured by the right SVM camera 10*c* may include areas ⓒ, ⓖ, ⓗ, ⓘ, and ⓛ to the right of the right dotted line. The original image captured by the rear SVM camera 10*d* may include areas ⓕ, ⓙ, ⓚ, ⓛ, and ⓘ under the lower dotted line.

In the surround view image generated by performing a target area setting, distortion correction, perspective transform, and image matching based on the original images captured by the plurality of SVM cameras, the image areas based on the original image captured by the front SVM camera 10*a* may include areas ⓐ, ⓑ and ⓒ, the image areas based on the original image captured by the left SVM camera 10*b* may include areas ⓓ, ⓔ and ⓕ, the image areas based on the original image captured by the right SVM camera 10*c* may include areas ⓖ, ⓗ, and ⓘ, and the image areas based on the original image captured by the rear SVM camera 10*d* may include areas ⓙ, ⓚ, and ⓛ. The set target area may include some of areas that may overlap with images captured by adjacent SVM cameras.

Figure 4A:
FIG. 4A (Prior Art)
FIG. 4A is a diagram of an SVM display screen when a rear SVM camera fails in a rear-view mode in a conventional SVM system.

For example, in a conventional SVM system, when the rear SVM camera fails in a rear-view mode, a rear image and a surround view image output to the SVM display may be displayed as shown in FIG. 4A. In other words, it may be identified that some of the rear image and the surround view image are not displayed. As such, when a portion of the view around a vehicle may not be provided to a driver while driving or parking, a risk of a collision or the like may occur.

The image processing unit 220 performs image processing to minimize an empty area in the surround view image, that is, a non-display area, thereby mitigating or eliminating the aforementioned problems. Specifically, the image processing unit 220 may replace the empty area in the surround view image by utilizing the original image captured by the working SVM camera adjacent to the failed SVM camera and/or the image captured by the built-in cam camera.

For example, in a rear-view mode, when the rear SVM camera 10*d* fails and the left and right SVM cameras 10*b* and 10*c* are in normal operation, the image processing unit 220 may set the target area of the original image captured by the left SVM camera 10*b* to include area ⓙ, and set the target area of the original image captured by the right SVM camera 10*c* to include area ⓛ in the image processing process. In other words, in the image processing process, the overlapping area (ⓙ and ⓛ) between the capturable range of the rear SVM camera 10*d* and the capturable range of the left SVM camera 10*b* or the right SVM camera 10*c* is set to be included in the target area, an empty area in a surround view image to be generated may be reduced.

Furthermore, when the rear camera 40*b* of the built-in cam is also in normal operation, the image processing unit 220 may replace area ⓚ of the surround view image by utilizing the rear image of the built-in cam, and simultaneously, replace the rear image to be output on the SVM display 30 with the rear image of the built-in cam. Thereafter, the image processing unit 220 generates a surround view image by utilizing the original image captured by the working SVM camera adjacent to the failed SVM camera and/or the built-in cam image.

The image processing unit 220 may further perform image processing to minimize a sense of difference between the image captured by the SVM camera and the image captured by the built-in cam camera or to equalize the brightness of an image boundary. To this end, the image processing unit 220 may further perform image correction using Histogram Equalization (HE), Histogram Matching (HM), and the like.

Figure 4B:
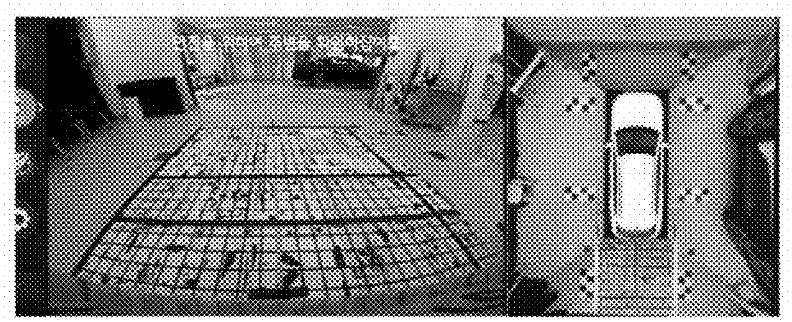
FIG. 4B is a diagram of an SVM display screen when a rear SVM camera fails in a rear-view mode in a surround view monitoring apparatus according to an embodiment of the present disclosure.
Figure 4C:
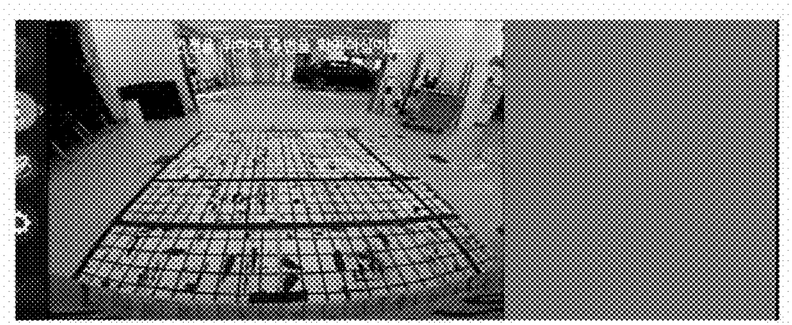
FIG. 4C is a diagram of an SVM display screen when an SVM function is performed based on the built-in cam image due to a failure of all SVM cameras in a rear-view mode in a surround view monitoring apparatus according to an embodiment of the present disclosure.

FIG. 4B is a diagram in which in a rear-view mode, when the rear SVM camera 10*d* fails and the left and right SVM cameras 10*b* and 10*c* are in normal operation, a rear view image and a surround view image output to the SVM display 30 are displayed in the surround view monitoring apparatus according to an embodiment of the present disclosure. Referring to FIG. 4B, it may be identified that a conventional issue in which a portion of a rear view image and a surround view image is empty may be solved by a fault tolerant function according to an embodiment of the present disclosure.

In addition, when the front SVM camera fails in a front-view mode, there is an issue that a portion of the front view image and the surround view image output to the SVM display in the conventional SVM system is empty, which may be solved in the same way by the fault tolerant function according to an embodiment of the present disclosure described above.

In addition, even when a failure occurs in the front SVM camera 10*a* and/or the rear SVM camera 10*d*, but the built-in cam image may not be utilized, the image processing unit 220 may minimize an empty area of the surround view image by utilizing only an original image captured by the working SVM camera adjacent to the failed SVM camera. The case in which the built-in cam image may not be utilized means a case in which the image processing unit 220 may not receive the built-in cam image due to a failure of the built-in cam controller 50 and/or the built-in cam cameras 40*a* and 40*b*.

When the left SVM camera 10*b* and/or the right SVM camera 10*c* fails, the image processing unit 220 may minimize an empty area in the surround view image by utilizing an original image captured by the working SVM camera adjacent to the failed SVM camera.

Figure 4D:
FIG. 4D (Prior Art)
FIG. 4D is a diagram of an SVM display screen when a left SVM camera fails in a front-view mode in a conventional SVM system.

FIG. 4D is a diagram of an SVM display screen when a left SVM camera fails in a front-view mode in a conventional SVM system.

Figure 4E:
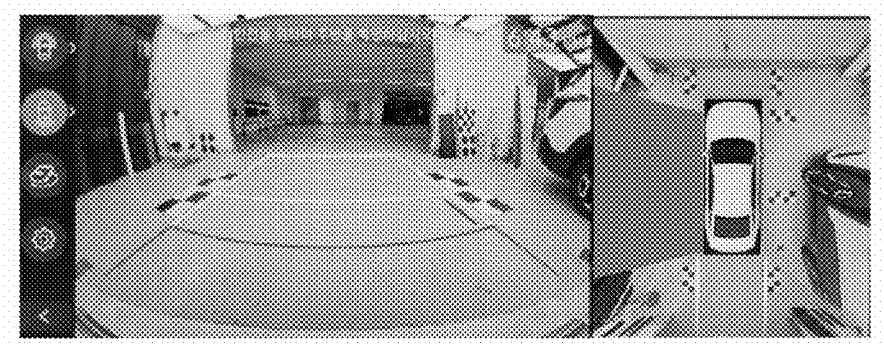
FIG. 4E is a diagram of an SVM display screen when a left SVM camera fails in a front-view mode in a surround view monitoring apparatus according to an embodiment of the present disclosure.

FIG. 4E is a diagram of an SVM display screen when a left SVM camera fails in a front-view mode in a surround view monitoring apparatus according to an embodiment of the present disclosure.

Referring to FIGS. 4D and 4E, when the left SVM camera fails in a front-view mode, compared to the conventional SVM system, it may be seen that the empty area in the surround view image generated by the surround view monitoring apparatus according to an embodiment of the present disclosure is reduced.

Figure 4F:
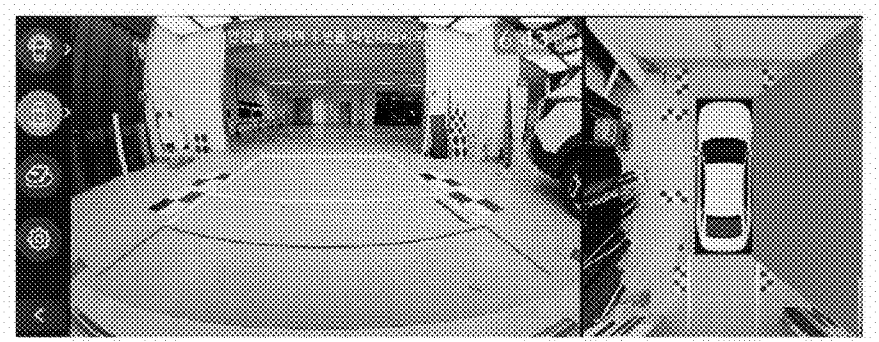
FIG. 4F (Prior Art)
FIG. 4F is a diagram of an SVM display screen when a right SVM camera fails in a front-view mode in a conventional SVM system.

FIG. 4F is a diagram of an SVM display screen when a right SVM camera fails in a front-view mode in a conventional SVM system.

Figure 4G:
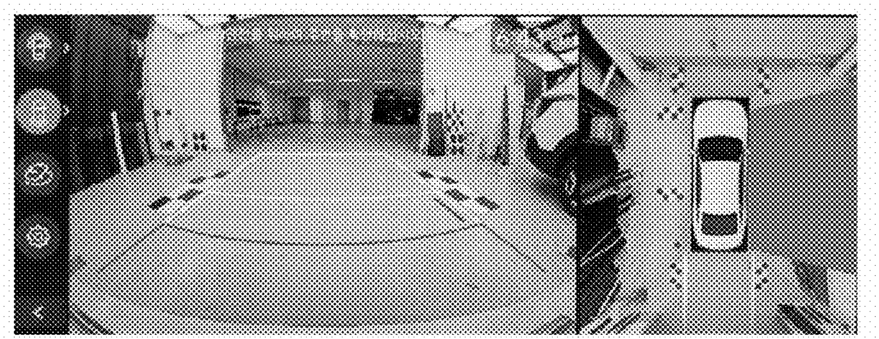
FIG. 4G is a diagram of an SVM display screen when a right SVM camera fails in a front-view mode in a surround view monitoring apparatus according to an embodiment of the present disclosure.

FIG. 4G is a diagram of an SVM display screen when a right SVM camera fails in a front-view mode in a surround view monitoring apparatus according to an embodiment of the present disclosure.

Referring to FIGS. 4F and 4G, when the right SVM camera fails in a front-view mode, compared to the conventional SVM system, the empty area in the surround view image generated by the surround view monitoring apparatus according to an embodiment of the present disclosure is reduced.

The image processing unit 220 may refer to a look-up table stored in the memory of the SVM controller 20 to reduce the amount of calculation when performing distortion correction and perspective transform.

Figure 5:
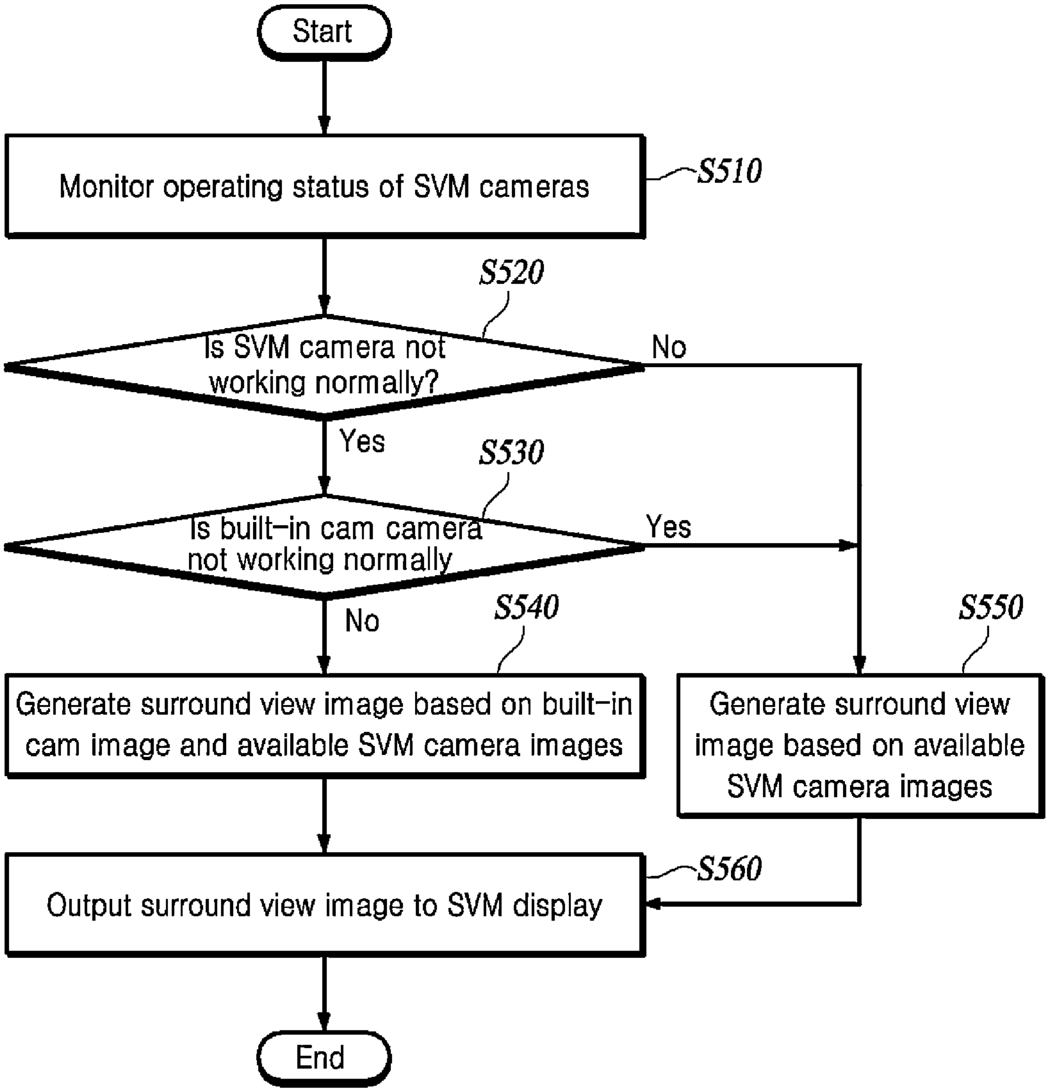
FIG. 5 is a flowchart of a method performed by a surround view monitoring apparatus according to an embodiment of the present disclosure.

FIG. 5 is a flowchart of a method performed by a surround view monitoring apparatus according to an embodiment of the present disclosure.

Referring to FIG. 5, the fault determination unit 210 periodically monitors the operating status of the plurality of SVM cameras (S510).

The fault determination unit 210 determines whether each of the plurality of SVM cameras fails (S520).

When one of the plurality of SVM cameras 10 are determined to have failed, the fault determination unit 210 transmits information about the failed SVM camera to the image processing unit 220. In addition, when the failed SVM camera is the front SVM camera 10*a* and/or the rear SVM camera 10*d*, the fault determination unit 210 may instruct the image processing unit 220 to further utilize the front and/or rear images captured from the built-in cam camera 40 to perform image processing.

When all of the plurality of SVM cameras 10 are determined to have failed, the fault determination unit 210 may request the built-in cam controller 50 to transmit front and/or rear images captured by the built-in cam camera to the SVM display 30.

When it is determined that the plurality of SVM cameras 10 are operating normally, the image processing unit 220 generates a surround view image based on images received from the plurality of SVM cameras 10 (S550).

When one or more of the plurality of SVM cameras 10 is determined to have failed, the surround view monitoring apparatus may operate in a fault tolerant mode through functional co-operation with the built-in cam.

The fault determination unit 210 may determine whether the built-in cam fails (S530).

When it is determined that the built-in cam fails, functional co-operation with the built-in cam cannot be performed, so the image processing unit 220 may generate a surround view image based on the images received from the working cameras among the plurality of SVM cameras 10 (S550).

The image processing unit 220 may supplement an image not received from the rear SVM camera 10*d* in which a failure occurs by utilizing an original image captured by the working SVM camera adjacent to the failed SVM camera.

When it is determined that the built-in cam is in normal operation, since functional co-operation with the built-in cam may be performed, the image processing unit 220 may generate a surround view image based on the image received from the built-in cam and the images received from the working cameras among the plurality of SVM cameras 10 (S540).

The image processing unit 220 may utilize the original image captured by the working SVM camera adjacent to the failed SVM camera and/or the image captured by the built-in cam camera, and may replace an image not received from the rear SVM camera 10*d* in which a failure occurs.

The surround view image generated by the image processing unit 220 is output to the SVM display 30 (S560).

Each component of the device or method according to an embodiment of the present disclosure may be implemented by hardware, software, or a combination of hardware and software. In addition, the function of each component may be implemented by software and the microprocessor may be implemented to execute the function of software corresponding to each component.

Various implementations of the systems and techniques described herein may be implemented by digital electronic circuits, integrated circuits, field programmable gate arrays (FPGAs), application specific integrated circuits (ASICs), computer hardware, firmware, software, and/or a combination thereof. These various implementations may include being implemented in one or more computer programs executable on a programmable system. The programmable system includes at least one programmable processor (which may be a special purpose processor or a general purpose processor) coupled to receive data and instructions from, and transmit data and instructions to, a storage system, at least one input device, and at least one output device. Computer programs (also known as programs, software, software applications or code) include instructions for a programmable processor and are stored on a "computer-readable recording medium."

The computer-readable storage medium includes any kinds of storage devices that store data readable by a computer system. The computer-readable storage medium may include non-volatile or non-transitory medium such as ROM, CD-ROM, magnetic tape, floppy disk, memory card, hard disk, magneto-optical disk, and storage device, and also further include a transitory medium such as a data transmission medium. Moreover, the computer-readable storage medium may be distributed in computer systems connected through a network, and computer-readable codes may be stored and executed in a distributed manner.

In the flowcharts in the present specification, it is described that each process sequentially occurs, but this is merely an example of the technology of an embodiment of the present disclosure. In other words, a person having ordinary skills in the art to which an embodiment of the present disclosure pertains may make various modifications and variations by changing the orders described in the flowcharts in the present specification or by undergoing one or more of the processes in parallel within the essential characteristics of an embodiment of the present disclosure, so the flowcharts in this specification are not limited to a time-series order.

Although embodiments of the present disclosure have been described for illustrative purposes, those having ordinary skill in the art should appreciate that various modifications, additions, and substitutions are possible, without departing from the idea and scope of the claimed present disclosure. Therefore, embodiments of the present disclosure have been described for the sake of brevity and clarity. The scope of the technical idea of the embodiments of the present disclosure is not limited by the illustrations. Accordingly, one of ordinary skill in the art would understand the scope of the claimed present disclosure is not to be limited by the above explicitly described embodiments but by the claims and equivalents thereof.

REFERENCE NUMERALS

10: SVM camera
20: SVM controller
30: SVM display
40: built-in cam camera
50: built-in cam controller

What is claimed is:

1. A surround view monitoring (SVM) apparatus with fault tolerance, the surround view monitoring apparatus comprising:

a plurality of SVM cameras configured to capture images of surrounding areas of a vehicle;

a SVM controller configured to determine whether at least one of the plurality of SVM cameras has failed, the SVM controller further configured to generate a surround view image based on images captured by the plurality of SVM cameras; and a SVM display configured to display the generated surround view image, wherein the plurality of SVM cameras comprises a front SVM camera for capturing a front of the vehicle, a rear SVM camera for capturing a rear of the vehicle, a left SVM camera for capturing a left of the vehicle, and a right SVM camera for capturing a right of the vehicle, and wherein (i) in response to determining that the front SVM camera has failed, the SVM controller is configured to generate the surround view image by utilizing images captured by a front camera included in a built-in cam together with the images captured by the plurality of SVM cameras excluding the front SVM camera, (ii) in response to determining that the rear SVM camera has failed, the SVM controller is configured to generate the surround view image by utilizing images captured by a rear camera included in the built-in cam together with the images captured by the plurality of SVM cameras excluding the rear SVM camera, and (iii) in response to determining that all of the plurality of SVM cameras have failed, the SVM controller is configured to reset the plurality of SVM cameras.

2. The apparatus of claim 1, wherein the SVM controller is configured to set a target area for each of the images captured by the plurality of SVM cameras, wherein the SVM controller is further configured to perform distortion correction and perspective transform on the set target area and then match each of the target areas to generate the surround view image.

3. The apparatus of claim 2, wherein upon determining that at least one of the plurality of SVM cameras has failed, the SVM controller is configured to set the target area of an image captured by a SVM camera of the plurality of SVM cameras in normal operation adjacent to the failed SVM camera to include an overlapping area, and wherein the overlapping area is an area overlapping between a capturable range of the failed SVM camera and a capturable range of the adjacent SVM camera in normal operation.

4. The apparatus of claim 3, wherein upon determining that the failed SVM camera is the front SVM camera, the SVM controller is configured to:

acquire a front image captured by the front camera included in the built-in cam, perform perspective transform on the front image, and then match each of the target areas with the front image.

5. The apparatus of claim 3, wherein upon determining that the failed SVM camera is the rear SVM camera, the SVM controller is configured to:

acquire a rear image captured by the rear camera included in the built-in cam, perform perspective transform on the rear image, and then match each of the target areas with the rear image.

6. The apparatus of claim 1, wherein upon determining that at least one of the plurality of SVM cameras has failed, the SVM controller is configured to visually or audibly provide a notification to a driver of the vehicle that the SVM is switching to a fault tolerant mode.

7. The apparatus of claim 1, wherein upon determining that all of the plurality of SVM cameras have failed, the SVM controller is configured to request a built-in cam controller included in the built-in cam to transmit at least one of a front image captured by the front camera and a rear image captured by the rear camera to the SVM display.

8. A non-transitory computer readable medium storing a program thereon executed by a processor of a surround view monitoring (SVM) apparatus with fault tolerance to perform a method, the method comprising:

determining whether at least one of a plurality of SVM cameras has failed, wherein the plurality of SVM cameras comprises a front SVM camera for capturing a front of a vehicle, a rear SVM camera for capturing a rear of the vehicle, a left SVM camera for capturing a left of the vehicle, and a right SVM camera for capturing a right of the vehicle;

based on determining that the front SVM camera has failed, generating a surround view image based on images captured by the plurality of SVM cameras excluding the front SVM camera that has failed; and based on determining that the rear SVM camera has failed, generating the surround view image based on images captured by the plurality of SVM cameras excluding the rear SVM camera that has failed; and displaying the generated surround view image on an SVM display, wherein generating the surround view image comprises, generating the surround view image by utilizing images captured by a built-in cam including a front camera and a rear camera, together with the images captured by the plurality of SVM cameras, wherein the images captured by the built-in cam include a front image captured by the front camera included in the built-in cam and a rear image captured by the rear camera included in the built-in cam, and wherein generating the surround view image includes i) based on determining that the front SVM camera has failed, generating the surround view image using the front image together with the images captured by the plurality of SVM cameras excluding the front SVM camera, and ii) based on determining that the rear SVM camera has failed, generating the surround view image using the rear image together with the images captured by the plurality of SVM cameras excluding the rear SVM camera, based on determining that all of the plurality of SVM cameras have failed, resetting the plurality of SVM cameras, transmitting at least one of the front image captured by the front camera or the rear image captured by the rear camera to the SVM display, and displaying the transmitted image on the SVM display.

9. The method of claim 8, wherein generating the surround view image comprises:

setting a target area for each of the images captured by SVM cameras among the plurality of SVM cameras that have not failed;

performing distortion correction and perspective transform on the set target area; and matching each of the target areas to generate the surround view image.

10. The method of claim 9, wherein generating the surround view image comprises, based on determining that at least one of the front SVM camera or the rear SVM camera has failed, setting the target area of an image captured by an adjacent SVM camera in normal operation that is adjacent to the failed SVM camera to include an overlapping area, wherein the overlapping area is an area overlapping between a capturable range of the failed SVM camera and a capturable range of the adjacent SVM camera in normal operation.

11. The method of claim 10, wherein based on determining that the front SVM camera has failed, generating the surround view image comprises:

acquiring the front image captured by the front camera included in the built-in cam;

performing perspective transform on the front image; and matching each of the target areas with the front image.

12. The method of claim 10, wherein based on determining that the rear SVM camera has failed, generating the surround view image comprises:

acquiring the rear image captured by the rear camera included in the built-in cam;

performing perspective transform on the rear image; and matching each of the target areas with the rear image.

13. The method of claim 8, further comprising:

visually or audibly providing a notification to a driver of the vehicle that the SVM is switching to a fault tolerant mode based on determining that at least one of the front SVM camera or the rear SVM camera has failed.

* * * * *